United States Patent [19]
Miller

[11] 3,869,525
[45] Mar. 4, 1975

[54] COMPOSITION COMPRISING A MIXTURE OF THERMOPLASTIC POLYMERS FOR INTERNAL CLEANING OF EXTRUDERS

[75] Inventor: Donald N. Miller, Rochester, N.Y.

[73] Assignee: Eastman Kodak Company, Rochester, N.Y.

[22] Filed: Aug. 6, 1973

[21] Appl. No.: 386,144

Related U.S. Application Data

[62] Division of Ser. No. 248,958, May 1, 1972, Pat. No. 3,776,774.

[52] U.S. Cl................. 260/873, 134/7, 134/8, 134/22 R, 134/23, 134/38, 264/39
[51] Int. Cl............................................. C08g 39/10
[58] Field of Search.......... 260/860, 873, 28; 134/7, 134/8; 51/298; 252/182

[56] References Cited
UNITED STATES PATENTS

| | | | |
|---|---|---|---|
| 3,562,200 | 2/1971 | Jones et al. | 260/873 |
| 3,639,424 | 2/1972 | Gray, Jr. et al. | 260/873 |

*Primary Examiner*—Morris Liebman
*Assistant Examiner*—T. Pertilla
*Attorney, Agent, or Firm*—E. W. Milan

[57] ABSTRACT

A process and an extruder cleaning composition are disclosed for removing deposits of encrusted and decomposed material at elevated temperatures from the interior surfaces in contaminated zones of an extruder.

The extruder cleaning composition comprises (1) discrete, crushable particles of a highly crystalline thermoplastic first polymer having a high brittle point and (2) a thermoplastic second polymer which has a melting point below said brittle point and which upon heating above its said melting point forms a fluid-phase carrier for said particles, said highly crystalline polymer having a melting point up to about 350° C. One method of operating the process comprises charging the composition into the inlet of the barrel of an extruder while the extruder is operated at barrel temperatures which ahead of and in its contaminated zones are above the melting point of the second polymer and below the brittle temperature of the first polymer, melting the second polymer in the barrel ahead of said contaminated zones, crushing the first polymer in said contaminated zones and thereafter melting said crushed polymer in the barrel, and removing the composition from the outlet of the barrel in melted form along with loosened deposits occluded therein.

8 Claims, 1 Drawing Figure

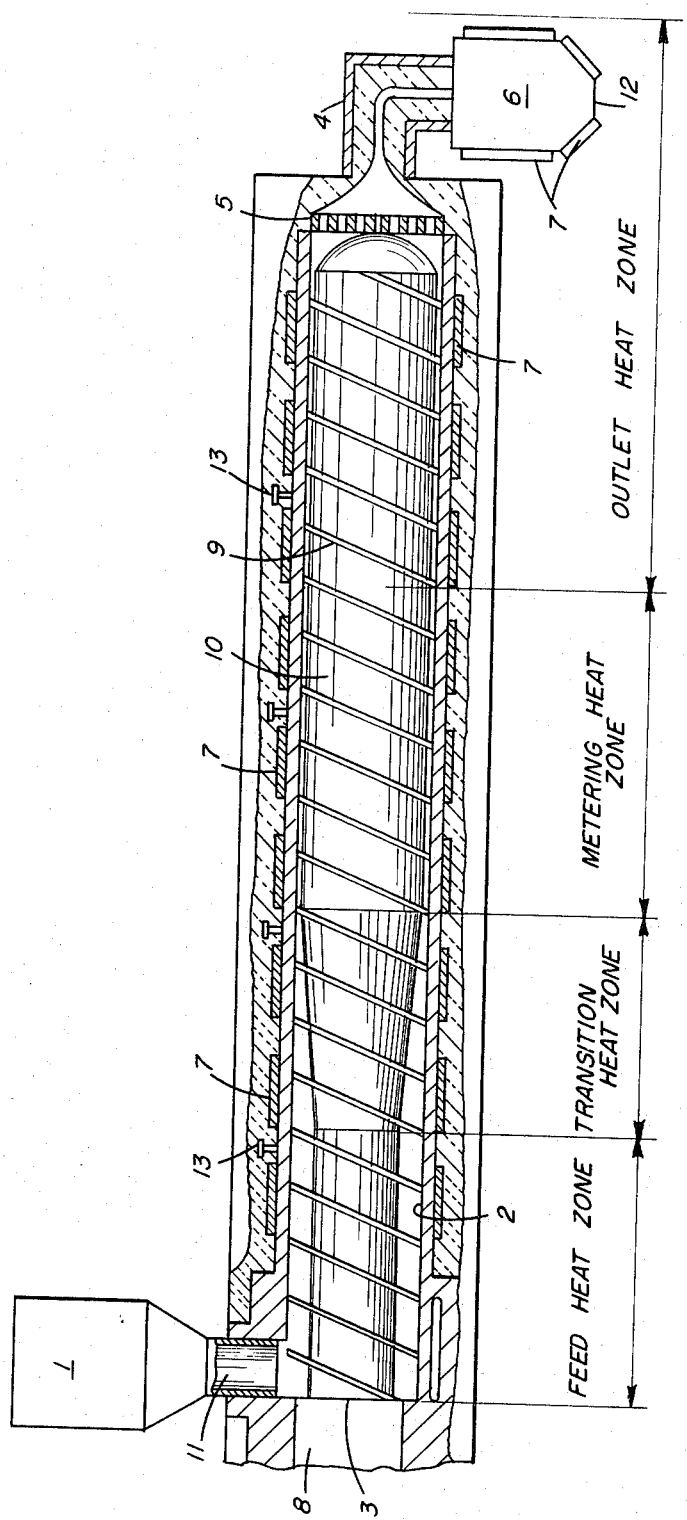

COMPOSITION COMPRISING A MIXTURE OF THERMOPLASTIC POLYMERS FOR INTERNAL CLEANING OF EXTRUDERS

This is a division of application Ser. No. 248,958, filed May 1, 1972, now U.S. Pat. No. 3,776,774.

BACKGROUND OF THE INVENTION

1. Field of the Invention

This invention relates to the art of removing deposits of encrusted and decomposed materials from the interior surfaces in contaminated zones of extruders. One type of extruder to which the invention is applicable is shown in the drawing and usually comprises a feed hopper 1, a barrel 2, a stock screw 3, an adapter 4, screen pack 5, a die 6, heaters 7, drive shaft 8, and temperature controls 13 for the heaters 7, along with drive means for the drive shaft, which are not shown. The drawing is a diagrammatical sectional view showing the interior arrangement of the various heat zones with relation to the screw 3 and barrel 2 and the inlet 11 and outlet 12 of the extruder.

The invention is particularly useful in cleaning of such extruders which have been used to extrude high density polyethylene (D = 0.940 to 0.965 gm./cc.) onto the surface of paper by known melt coating techniques to make polyethylene coated paper used in the photographic arts. Such extruders are more commonly referred to as paper coating extruders. In this field, the coating of paper for photographic use often is done on an around-the-clock basis in continuous runs which may last for several days at a time, or until indications are found of the existence of an accumulation of gels or of oxidized or otherwise off-grade coating material in the extruder. The off-grade polyethylene is formed as a result of deposits of polyethylene which occur in the extruder barrel particularly between the screw lands 9 and the interior wall of the barrel 2, and in slow moving deposits in the flights 10 of the screw 3 in the extruder from which the polyethylene is not continuously flushed as the polyethylene passes through the extruder on its way to the expressing die 6. The deposits of polyethylene are exposed to the high temperatures existing in the extruder for long periods of time, e.g. up to one week or more, and eventually begin to char or to form into brownish high melting polymer which when it becomes dislodged and enters the normal flow of the polyethylene through the extruder causes gel spots or discolored spots in the coating on the coated paper product.

A "gel spot" may be defined, for the purpose of the invention, as a particle of organoplastic material, e.g. polyethylene, which is more highly polymerized, and which therefore has a lower melt index, for example, as determined by ASTM D1238E, than does the main mass of the organoplastic material. Because of this difference in melt indexes, and in viscosities, the gel particle or spot remains in the coating as a non-melted body surrounded by an accumulation of organoplastic material after the latter material hardens. The accumulation of material magnifies the size of the defects in the solidified coating. The gel spots may vary in size from tiny grains which degrade the coating to large flakes, which cause plugging of the screen pack 5 ahead of the die 6. other gels present are accumulations of higher melt viscosity polymer without distinct polymer centers. The quality of photographically sensitized porducts is critically dependent on the absence of such gel particles in the coating coating.

The adverse effects of high temperatures on polyethylene are well known in the extrusion art and have been confirmed in laboratory tests, where it was found that pellets of high density polyethylene when exposed to air for approximately 5 minutes at 260° C. turned yellow and produced a condition of brown particles similar to those causing defects in extruded coatings on paper.

2. Description of the Prior Art

Prior to this invention, when the gel spots and discolored spots began to appear in the coating on the coated photographic paper, the extruder was shut down and subjected to a dismantling operation. The dismantling operation required the services of several maintenance men over a period of several hours during which time the men were exposed to the heat from the hot extruder machine parts. Each cleaning operation resulted in cleaning and downtime costs of many hundreds of dollars. The mechanical cleaning operation involved use of copper cloths and wire brushes which were needed to scrape away and dislodge the deposits of brown, oxidized polymer from the screw 3 and barrel 2 of the extruder. In the dismantling operation, it was necessary to heat all parts to temperatures of several hundred degrees; the adapter 4, the die 6, the screen pack 5 normally present, and the screw 3 then being removed. Thus, in addition to the cost of the operation, considerable hazard to the workmen was present. When a "dirty" extruder was dismantled, it was found that the accumulations of brown oxidized polyethylene deposits including gel particles were present mostly on the screw 3 and on the interior wall of the barrel 2 of the extruder in the "transition heat zone" of the extruder; which is shown in the drawing and herein later discussed.

The adverse effects of gel spots and discolored spots on the quality of the photographic paper are well known to those skilled in the photographic film manufacturing art. For example, light-sensitized products are very sensitive to the presence of gel spots. The gel particles cause uneven photographic density and some large particles even interrupt the uniformity of the coating of the coated paper product, resulting in a rough, grainy and otherwise irregular surface which is seriously detrimental to the attainment of a uniform surface when photographic emulsion is subsequently applied to the polyethylene coating on the face side of the coated paper.

Processes for removing decomposed or encrusted organoplastic materials, such as, polyethylene, from metal surfaces by passing a purging composition comprising a thermoplastic polymer and/or a crushable organic material through a "dirty" extruder have been described in prior art patents. For example, U.S. Pat. No. 2,346,228 teaches cleaning of molding machines and extruders by use of a purging composition containing a vinyl resin, plasticizer and a mildly abrasive filler. U.S. Pat. No. 2,744,841 teaches removing contaminated polyethylene resin from metal surfaces by contacting the polyethylene resin adhered on the surfaces with pentaerythritol at a temperature above the softening point of the polyethylene and below the melting point of the pentaerythritol and with drawing said contaminated polyethylene and pentaerythritol from the metal surfaces. Granular pentaerythritol is introduced into the extruder and feeding continued until the material emerging from the die is powdered pentaerythritol. U.S. Pat. No. 2,779,696 teaches removing carbonaceous deposits from the interior of extruders by passing through the extruder polyethylene granules dusted with a blowing agent and wetted with water. U.S. Pat. No. 3,071,498 teaches a composition and method for cleaning interior plastics-working surfaces of plastic extruders which composition comprises a granular organoplastic material, e.g. polyvinyl chloride or polyethylene, and from about 0.2 to about 2 percent of silicone oil in the form of a film coating on the granules, the organoplastic material being thermoplastic and incompatible with the silicone oil. The composition is fed into the extruder while maintaining the extruder temperature between about 150° and 210° C. so that a substantial portion of the silicone coated granules tend to retain their initial plastic memory properties. U.S. Pat. No. 3,119,720 teaches an improvement on the method of U.S. Pat. No. 2,744,841, which was found to cause clogging of the extruder with the pentaerythritol. A mixture of pentaerythritol and polyethylene is used. The improvement also comprises using a second purging composition which is extruded at the same temperature range as the polyethylene-pentaerythritol mixture, but which comprises a combination of an alkali metal hydroxide, an organic or inorganic sequestering agent and a polyethylene resin, followed by a water wash to remove residual pentaerythritol.

While these prior art methods may be found effective for cleaning contaminated extruders generally, their use for cleaning an extruder used to extrude such materials as polyethylene onto paper to form coated paper which will later serve as a base for a photographic emulsion or another very sensitive coating is undesirable because unwanted residues of such purging compositions, e.g. silicone oil, blowing agent, pentaerythritol, or sequestering agent, may be left in the extruder and have an adverse effect on the end use of the coated paper. This is true even when a follow-up purge with organoplastic material of the type to be extruded is used after using one of the prior art compositions. The extruder cleaning composition of the present invention has been found to clean efficiently and to leave substantially no harmful residues in the extruder.

SUMMARY OF THE INVENTION

The present invention comprises an extruder scouring and cleaning composition having a first component which is a highly crystalline brittle thermoplastic polymer having a brittle point above the melting point of a second polymer component. In addition, the first component is high melting and is in discrete crushable particle form while the second component is a lower melting thermoplastic polymer which when melted in the extruder during the cleaning operation serves as a viscous fluid-phase for carrying the first component. In use the first component serves to scour encrusted and decomposed deposits from the interior surfaces of an extruder while being propelled and crushed by the screw of the extruder. In carrying out the cleaning according to the process of the invention, temperatures in the barrel of the extruder can be controlled in the heat zones of the extruder to cause the second component to melt near the inlet 11 of the extruder and to prevent the first component from being heated above its brittle point until the composition has been propelled through the contaminated zones of the extruder, which may be anywhere along the screw 3 and barrel 2 of the extruder. The temperature of the interior of the extruder beyond the contaminated zones, e.g. in the outlet heat zone, can be controlled to cause the first component also to melt.

In carrying out a process according to this invention, the brittle polymer component is crushed by the extruder screw 3 in the extruder barrel 2, thereby effecting a scouring action on the surfaces 9, 10 of the screw 3 and of the extruder barrel 2 inner surfaces, particularly in the contaminated zones, e.g. the transition and metering heat zones, where resistance is greater to passage of the solid polymer particles. This action loosens and removes deposits in the contaminated zones of the extruder. The melted second component polymer is necessary in the composition to cause the particles of first polymer to be propelled through the extruder efficiently without slippage and forming of voids. The melted component, due to its viscous state, also aids in loosening and picking up the deposits being scoured and loosened from the surfaces of the extruder by the first polymer. In their passage through the extruder, both components of the composition form a melted blend including the loosened deposits. The melted blend is maintained in its melted state until propelled out of the extruder.

In use the thermoplastic materials in the composition are generally sufficiently melted in the extruder by the time the scouring and purging composition reaches the screen pack 5 usually present at the adapter 4 of the extruder to permit the composition to pass through the screens of the screen pack 5 so long as the screens are not plugged by loosened deposits. In some cases, it may be desirable to remove the fine screens of the screen pack 5 to prevent plugging by massive amounts of loosened particles.

DESCRIPTION OF THE PREFERRED EMBODIMENTS

The scouring and purging composition of this invention comprises (1) discrete, crushable particles of a highly crystalline thermoplastic first polymer having a high brittle point and (2) a thermoplastic second polymer which has a melting point below said brittle point and which upon heating above its said melting point forms a fluid-phase carrier for said particles, said highly crystalline polymer having a melting point up to about 350° C. The first polymer is capable of being crushed while embedded in the second polymer when the second polymer is in a fluid state at controlled cleaning temperatures in the barrel 2 of the extruder in which the mixture is used as a cleaning composition and also is generally capable of being melted in the extruder at least before leaving the outlet heat zone of the extruder, preferably before reaching the screen pack 5 ahead of the outlet 12 of the barrel 2.

More particularly, the invention relates to an extruder cleaning composition for removing deposits of encrusted and decomposed organoplastic material from the interior surfaces of a screw-type extruder having controlled heat zones including an outlet heat zone, said composition comprising a mixture containing, by weight of the composition, (*a*) from about 5 to about 95 parts of highly crystalline brittle thermoplastic polymer having a brittle point above about 135° C. and a melting point up to about 350° C., and (*b*) from about 95 to about 5 parts of a fluid-phase forming thermoplastic polymer having a melting point below the brittle point of said brittle polymer, said brittle polymer essentially being in the form of discrete crushable particles, and both of said polymers being meltable at least in the outlet heat zone of the extruder in which said composition is used. The composition may also contain from 0 to effective amounts, e.g. up to about 25 parts, of additives for stabilizing and extending said polymers.

Still more particularly, the invention relates to a scouring and purging composition for cleaning extruders of organoplastic materials having controlled heat zones including an outlet heat zone, said composition comprising a mixture containing by weight of the composition (a) from 5 to about 95 percent of a highly crystalline brittle linear polyester resin having recurring cyclic structure in the polymer backbone, preferably one made by condensing a glycol with a lower dialkyl ester of a dicarboxylic acid, e.g. poly(ethylene terephthalate), having a brittle temperature point above about 135° C., a melting point below about 315° C., and an intrinsic viscosity in phenol: chlorobenzene in about 60:40 weight ratio of from about 0.2 to about 1.3 deciliters per gram determined at about 25° C. in a solution containing about 0.5 g. of polymer per 100 milliliters of phenol:chlorobenzene; and (b) from about 95 to about 5 percent of a polyethylene having a melt index in the range from about 0.5 to about 15 g. per 10 minutes with ASTM test method D1238E and a melting point of about 80° to about 100° C., said polyester being in the form of discrete crushable particles, preferably in chip or flake form, and said polyethylene preferably being in the form of readily meltable discrete particles when the composition is charged into the extruder.

Furthermore, the invention relates to a process for cleaning the interior surfaces of an extruder using the compositions described hereinbefore. In a particular aspect the invention relates to a process for removing deposits of encrusted and decomposed organoplastic material from the interior surfaces of a screw-type extruder having a series of controlled heat zones arranged along the length of the extruder in ascending temperatures from the inlet to the outlet of the extruder, said heat zones including a feed heat zone, a transition heat zone, a metering heat zone and an outlet heat zone, said process comprising:

a. charging into the inlet of the extruder an effective amount of an extruder cleaning composition as described herein and comprising a mixture of a highly crystalline brittle thermoplastic first polymer in crushable discrete particle form admixed with a fluid-phase forming thermoplastic second polymer;

b. heating the feed heat zone and transition heat zone of the extruder to temperatures at least above the melting point of the second polymer and below the brittle temperature point of the first polymer;

c. propelling the composition through the feed heat zone and the transition heat zones of the extruder;

d. heating the outlet heat zone of the extruder at least to the melting point of the first polymer;

e. heating the metering heat zone to a temperature intermediate to that of the transition heat zone and the outlet heat zone; and f. propelling the composition through said metering heat zone and said outlet heat zone until the composition leaving the extruder is substantially free of occluded deposits of the organoplastic material.

The residual amounts of cleaning composition left in the extruder at the end of step (f) can be removed by charging into the extruder and propelling through the extruder a sufficient quantity of polyethylene or other material which is to be extruded by the cleaned extruder, to purge the extruder of the cleaning composition.

The present invention provides a process and composition whereby screw-type extruders used in expressing organoplastic materials, particularly polyolefin-based coating compositions, onto surfaces such as paper can be freed and kept substantially freed of accumulations of encrusted and decomposed materials, particularly gel particles, for much longer periods of time then was previously experienced and without need to dismantle the extruders completely for clean-out purposes.

The term "organoplastic material" as used herein includes any organic thermoplastic material of either virgin or compounded type, regardless of form, used throughout the plastics industry for making organoplastic articles and coatings by extrusion. In carrying out this invention, the thermoplastic second polymer is the composition is further characterized in that it has a melting point below the brittle point of the highly crystalline brittle thermoplastic first polymer component of the composition.

The "brittle temperature point," as used herein is the temperature at or above which the particles of highly crystalline brittle thermoplastic polymer used in the practice of the invention become non-brittle and will not break up into smaller particles under the crushing forces present in the extruder barrel 2. At such temperature point, the particles, however, may be plastically deformed. This brittle point for a given polymer can be readily determined by subjecting a polymer specimen to impact in a standardized but empirical way in accordance with ASTM test method 746-57T. The temperature at impact is varied until that temperature is found where statistically, one half of the specimens tested fail by brittle rupture. As is known to those skilled in the art, the brittle point is related to the glass transition temperature of a given polymer.

One screw-type extruder in which the invention is advantageously practiced is one of usual commercial design, as described herein and as illustrated in the drawing, which extruder is provided with heating means 7 so that it may be operated at increasingly higher temperatures from the feed hopper 1 to the outlet 12. The extruder preferably has at least four internal heat zones usually called (a) the feed heat zone; (b) the transition heat zone; (c) the metering heat zone; and (d) the outlet heat zone, respectively, disposed in that order after the feed hopper, and as shown in the drawing. Past experience with cleaning this type of extruder has shown that the greatest amounts of contaminated organoplastic material deposits occur in areas in the transition heat zone and the metering heat zone. The term "contaminated zones" is often used herein to refer mainly to these heat zones, which are comparatively high heat zones, compared to the feed heat zone.

The melting point of the highly crystalline brittle thermoplastic polymer component in the composition must be sufficiently high in comparison to the fluid-phase forming polymer component, to ensure that the brittle component material will be solid and remain in the brittle, crushable solid phase in the contaminated zones of the extruder, whereas the fluid-phase forming material preferably will be in a melted liquid phase in all the heat zones of the extruder after the feed heat zone, but should be so at least in the transition zone and in the heating zones thereafter.

The "melting point" of a polymer as used herein is often referred to in the art as the "polymer-melt temperature" and is the temperature at which a polymer becomes molten and leaves a trail when moved across a hot metal surface with moderate pressure. (See Sorenson and Campbell "preparative Methods of Polymer Chemistry", Interscience Publishers Inc., N.Y. Pages 49–50, 1961.)

The fluid-phase forming polymer component preferably is maintained slightly above but near its melting point during its passage through the contaminated zones in the extruder in order to be in a highly viscous state. The high viscosity of the melted or softened polymer then combines with the scouring action of the brittle polymer to purge deposits from the surfaces of the extruder with greater efficiency than the brittle polymer does if used along.

Typical highly crystalline thermoplastic polymers which can be used to provide the brittle component of the scouring and purging compositions of this invention are highly crystalline particle forms of substantially linear polyesters having recurring cyclic structure in the polymer backbone and an intrinsic viscosity in phenol:chlorobenzene in about 60:40 weight ratio, of from about 0.2 to about 1.3 deciliters per gram, having a brittle point above about 135° C. and a melting point in the range from about 175° to about 350° C. Viscosity is determined at 25° C. with solutions of 0.5 g. of the polymer per 100 milliliters of phenol:chlorobenzene.

The highly crystalline thermoplastic polymers employed are sufficiently crystalline to be brittle for the purposes of the invention. Preferably, the degree of crystallinity of a suitable first polymer component as described herein, will be at least 60% by weight, as determined by a standard method, e.g. X-ray diffraction. A preferred polyester is poly(ethylene terephthalate), although others advantageously may be employed, particularly those in which one component of the recurring unit in the polyester chain is derived from terephthalic acid, diphenyl methane p, p'dicarboxylic acid, diphenyl p,p'dicarboxylic acid, diphenyl ethane, p,p'dicarboxylic acid, or napthalene dicarboxylic acids such as napthalene 2,6- and napthalene-2,7-dicarboxylic acids.

Various aliphatic glycols, generally those having 2–4 carbons and preferably the trans and cis isomers of 1–4 cyclohexane dimethanol can be reacted with the indicated diacids to form polyesters useful as first polymer components in practicing this invention. Block and random copolymers of these same materials can be employed. Examples of such polyesters are poly(1,4-cyclohexylenedimethylene terephthalate), poly(ethylene isophthalate), poly(tetramethylene terephthalate), poly(ethylene naphthalenedicarboxylate). Mixtures of two or more highly crystalline first polymers such as the polyesters can be used for practice of the invention.

Methods for obtaining polyesters having the desired high crystallinity are well known in the polymer manufacturing art. See, for example, U.S. pat. Nos. 3,544,525; 3,497,477; and 3.104.011. Polyesters of the group described above which are brittle in the temperature range of about 135° to 315° C. and which have low intrinsic viscosities, e,g. 0.38 to 0.62, when melted are preferably used in practicing this invention.

The term "discrete crushable particle" as used herein is intended to include large granules, pellets, flakes, chips and other forms of the highly crystalline brittle thermoplastic polymer which are large enough to be further reduced in size by crushing in the extruder, but small enough to feed into the inlet of the extruder. Preferably, the crushable particles are in the form of discrete chips. The chips, e.g. of 60% crystalline poly(ethylene terephthalate) or other highly crystalline polyester, preferably are about one-sixteenths inch to one-fourth inch in thickness and about one-eighth inch to one-half inch from side-to-side along their widest surfaces. The chips can be made by breaking up sheeted forms of the crystalline polyester or other highly crystalline brittle thermoplastic polymer and screening them through a one-half inch × one-half inch mesh screen. The sizes of the chips may be varied considerably while still obtaining the advantages of the invention. For example, chips of poly(ethylene terephthalate) varying in size from those passing through a five-sixteenths inch mesh screen and a three-eighths inch mesh screen were found to be about as effective as those passing through the one-half inch mesh screen. The chip form is particularly advantageous because during the crushing action many sharp edges are formed on the resulting smaller particles, which are then available for highly efficient cleaning action.

The fluid-phase forming thermoplastic polymers employed in the practice of this invention readily melt in an extruder well below the brittle point of the highly crystalline brittle thermoplastic polymer in the scouring and purging composition. Illustrative of the fluid-phase forming thermoplastic polymer component of the scouring and purging composition which can be used to practice the invention are polyethylenes of different melt indexes (conveniently determined using ASTM D1238E) preferably those of melt indexes 8, 2.5, 1.1 and 0.5; polypropylene; copolymers of ethylene with copolymerizable ethylenically unsaturated monomers, such as, vinyl acetate or ethyl acrylate; polyvinyl acetate; polyvinyl chloride; a synthetic wax, e.g. one derived from ethylene; polybutylene; polyisobutylene; and the like. The thermoplastic material for the fluid phase may also be an amorphous form of polyester of the class of polyesters used for the solid phase polymer components, e.g. amorphous poly(ethylene terephthalate) having an intrinsic viscosity in the range of 0.2 to about 1.3, provided that the melting point of the amorphous polyester is adequately below that of the brittle point of the solid phase component of the composition. The fluid-phase forming thermoplastic polymer may be partly crystalline as well as amorphous. Some crystallinity is preferable because of the added scouring effect that may be obtained from the crushing of these crystals also before they are melted.

Preferably, the fluid-phase forming thermoplastic polymer component will be present in the composition as charged to the extruder in the form of pellets. The pellets, e.g. of polyethylene, preferably are commercially available pellets measuring about three-sixteenths inch in diameter and length. It will also be clear to those skilled in the art that the polyethylene could be made available in melted form and could be introduced into the feed zone of the extruder in such melted form with the chips of crystalline polyester already embedded therein, e.g. by premixing in an auxiliary heated mixer. However, introduction of both polymers in solid form to the feed hopper of the extruder is more advantageous for practice of the invention because of the added scouring effect of the pellets before they become softened and/or completely melted by the heat in the feed heat zone of the extruder.

The effective amount of the fluid-phase forming polymer component present in the scouring and purging composition is at least adequate to embody the brittle solid phase component and the deposits loosened and picked up by the fluid polymers in the extruder. Also, the effective amount of brittle solid phase polymer component present in the scouring and purging composition is at least adequate to scour the internal surfaces of the extruder to a desired degree of cleanliness, i.e., substantially free of oxidized polymer. Usually, the fluid-phase forming polymer component of the scouring and purging composition will be present in a major amount and the brittle solid phase polymer component in a minor amount by weight of the composition. The ratio of parts by weight of brittle solid phase polymer component present in the scouring and purging composition of the invention to the parts by weight of the fluid-phase forming polymer component present therein can be varied widely while still providing the advantages of the scouring and purging composition.

It is also to be understood that the thermoplastic materials used in practice of the invention, whether as the fluid-phase forming polymer component or as the brittle solid phase polymer component of the scouring and purging composition may contain various diluent fillers, e.g. titanium dioxide, antioxidants and heat stabilizers for the polymer, and other additives which can be used to extend the fluid-phase forming polymer component and to stabilize the polymers against degradation. Such additives may be present in effective amounts and may range from 0 to about 20% by weight of the composition.

Accordingly, the scouring and purging composition will contain from about 5 to about 95 parts of fluid-phase forming polymer component combined with from about 95 to about 5 parts of brittle solid phase polymer component and 0 to an effective amount, e.g. up to about 24 parts, of pigments, stabilizers and/or other additives, all parts being by weight. Preferably, the scouring and purging composition will consist essentially of from about 60 to 70 parts of fluid-phase forming polymer component combined with 30 to 40 parts of brittle solid phase polymer component, per 100 weight parts of composition. When the particles of brittle solid phase polymer are highly brittle small pellets, e.g. one-fourth inch in diameter, or less and of about the same length, the amount of fluid-phase forming polymer component can be reduced, e.g. to as little as 5 parts per 100 weight parts of the composition. When the brittle particles are very large, e.g. one-half inch × one-half inch × one-fourth inch, as much as 95 parts of fluid-phase forming polymer may be necessary to embed the particles in the melted fluid phase polymer.

The diameter and length of the extruder barrel 2 and the screw 3, the number of flights 10 in the screw, the depth of the grooves of the screw, the speed of rotation of the screw and such other features of the extruder, along with the degree of contamination of the extruder will determine the effective amount of scouring and purging composition which must be charged into and through the extruder in order to thoroughly purge a particular extruder. This amount may readily be determined by test runs. Usually about 50 to 100 lbs. of composition of the invention will be adequate to clean an extruder having a 4 ½ inch barrel inner diameter and a barrel length of about 10 feet.

The scouring and purging composition is fed into the extruder, preferably through the feed hopper 1, substantially continuously in sufficient amount to ensure that the contaminated extruder surfaces will be substantially clean by the time the last increment of the composition leaves the die 6 at the outlet 12 of the extruder.

In a most preferred form, the extruder scouring and purging composition of the invention will consist of brittle one-half inch by one-half inch × one-eighth inch chips of crystalline poly(ethylene terephthalate) having an intrinsic viscosity of from about 0.38 to 0.42 and a brittle temperature point up to about 235° C., admixed with three-sixteenths inch pellets of a low density polyethylene (D = 0.910 to 0.935 gm./cc.) having a melt index of about 8 grams per 10 minutes, admixed in the weight ratio of about 3 parts of poly(ethylene terephthalate) to 7 parts of polyethylene. In practicing the process, the chips of poly(ethylene terephthalate) are carried from the feed hopper 1 of the extruder into the screws 3 of the extruder along with the pellets of polyethylene.

In the process, the extruder barrel temperatures in the various heat zones preferably are set so that the fluid-phase forming thermoplastic polymer component will melt before it reaches the transition heat zone, and the highly crystalline brittle thermoplastic polymer component in the composition will not melt until it passes through the metering heat zone. The temperature in the outlet heat zone then is set high enough to soften or melt the polyester so that it and the other ingredients of the composition will pass through the screen pack 5 of the extruder and through the outlet 12 of the die 6 at a low viscosity. Accordingly, the temperatures maintained in the various processing heat zones of the extruder during the scouring and purging operation with a preferred scouring and purging composition of this invention preferably are set as shown in Table 1.

TABLE 1

| Extruder Processing and Heat Zones | Temperature °C. |
|---|---|
| Feed Heat Zone | 120 to 140 |
| Transition Heat Zone | 140 to 160 |
| Metering Heat Zone | 160 to 250 |
| Outlet Heat Zone | 250 to 275 |
| Die | 275 ± 10 |

During the cleaning operation, as the scouring and purging composition moves from the feed section of the extruder into the transition heat zone, the polyethylene pellets soften or melt into a viscous fluid polymer in which the chips of polyester are embedded. The brittle chips are readily crushed by the screw and scour the surfaces which they encounter in the feed and transition heat zones along with the viscous fluid polyethylene. The polyester chips preferably are sufficiently rapidly heated by the extruder heating means in each heat zone so that by the time that the polyester leaves each zone the polyester substantially has attained the temperature existent in the particular zone. Thus, the temperatures are controlled so that the polyester passes through the feed heat zone, the transition heat zone and most of the metering heat zone while the polyester is still in crushable solid form. However, after the metering heat zone, the temperature in controlled so that the polyester is softened by the heat and is substantially in a melted state as it passes through the outlet heat zone beginning at the adapter 4 by means of which the extruder barrel is connected to the expressing die 6 of the extruder. In passage through the extruder, and as they are being crushed, the solid particles of polyester scour the surfaces of the screw 3 and the interior of the barrel 2 of the extruder, loosening the deposits of gels, decomposed and otherwise off-grade polyethylene coating material accumulated on the surfaces. The loosened deposits are blended into the mass consisting of viscous fluid polyethylene and crushed polyester by the blending action of the screw 3 in the extruder barrel 2. By the time that the blend of polyethylene-polyester mass reaches the adapter 4, in the outlet heat zone, the deposits have been scoured from the surfaces where they had been accumulated and have been blended into the body of the then substantially fluid viscous mass. The entrained contaminant deposits then leave the extruder through the adapter 4, and outlet 12 with the then extrudable blend of scouring and purging composition.

In some cases it will be desirable and advantageous to remove the adapter 4, screen pack 5, and die 6 from the extruder before carrying out the cleaning operation. This modified procedure will be desirable when the extruder is heavily fouled and is first subjected to the cleaning process of this invention. Plugging of the screen pack 5 and die 6 by loosened deposits will thereby be avoided.

In practice, wherein the extruders may operate on a weekly shutdown basis, it will be found convenient to clean the extruder each week before the beginning of the first run of the week. By following such practice, the temperature zones of the extruder can be brought up to their most efficient temperatures for cleaning, which usually will be below the usual operating temperatures used for normal extrusion operation. By following such weekly cleanout practice as a preventive maintenance routine, a continual output of gel-free and contaminant-free coating product for at least the remainder of the week may be ensured.

In carrying out the cleaning when the extruder is in a heavily contaminated condition, it is desirable and sometimes necessary to remove only the screen pack 5 which is normally present in the extruder at the entrance to the adapter 4 for the purpose of screening out large gel particles from the fluid polyethylene coating material. This is done to avoid plugging the screens with loosened gel particles. The screen pack 5 usually consists of a combination of 20, 60 and 100 mesh screens. However, it has been found that after an extruder has been purged as described above on a preventive maintenance schedule, e.g. once each week, the screens can be left in the extruder during the week without danger of their becoming plugged, because the number of gel particles and large particles of loosened deposits which accumulate under such a schedule may be kept at a minimum by the frequent cleaning operation. The ease and low cost of carrying out the scouring and purging operation with the scouring and purging composition of the invention, as compared to manual cleanouts, makes such frequent purging desirable and advantageous. It is desirable to remove screen pack 5 and to replace the used screens with new screens after the cleaning operation.

During the carrying out of the scouring and purging operation in accordance with the invention, it has been observed that the temperatures in the transition heat zone and the metering heat zone of the extruder increase by about 10° to 15° C. above the set points of temperatures of the heater controls 13 used to control the temperatures. This rise in temperature is believed to be caused directly by the mechanical action of the extruder on the brittle polyester embedded in the viscous polyethylene in the extruder barrel. The increase in the amount of work being done by the extruder is indicated by amperage demand readings taken on the motor driving the screw of the extruder. The amperage readings at different revolutions per minute (RPM) for test runs made without polyester present and with polyester present in the purging and scouring composition made according to the invention are shown in Table 2.

TABLE 2

| Material | RPM | Amperes |
| --- | --- | --- |
| Low Density Polyethylene | 25 | 130 |
| Low Density Polyethylene | 50 | 180 |
| Scouring and Purging Composition* | 25 | 180 |
| Scouring and Purging Composition* | 65 | 300 |

*30% poly(ethylene terephthalate), intrinsic viscosity = 0.38 combined with 70% low density polyethylene, D=0.910.

Although the invention has been described in connection with one type of screw type extruder used in the extrusion of a coating grade of polyethylene, it will be understood by those skilled in the art of extruder operation that the invention can be practiced in other extruders and other machines having controlled heat zones in which other organoplastics are melt extruded and in which a crushing action can be obtained. Preferably, the organo-plastic material being extruded can be used to provided the fluid-phase forming polymer component of the purging composition and a suitable, appropriately brittle, crystalline polymer having an adequately higher melting point can be blended with the fluid-forming phase polymer component to provide the scouring and purging composition in accordance with the invention.

Specific preferred scouring and purging composition combinations which are advantageous for practice of the invention include the following, wherein all parts are by weight and melt index and intrinsic viscosity (I.V.) are determined as previously described above:

a. 5–95 parts of polyethylene having a melt index in the range of about 0.5 to about 15 g. per 10 minutes combined with about 95–5 parts of particulate crystalline poly(ethylene terephthalate) of I.V. = 0.20 to 1.3;

b. 5–95 parts of polyethylene having a melt index in the range of about 0.5 to about 15 g. per 10 minutes combined with about 95–5 parts of particulate crystalline poly(1,4-cyclohexylenedimethylene terephthalate) of I.V. = 0.2 to 1.3;

c. 5–95 parts of polyethylene having a melt index in the range of about 0.5 to about 15 g. per 10 minutes combined with about 95–5 parts of particulate crystalline poly(tetramethylene terephthalate) of I.V. = 0.2 to 1.3; and d. 5–95 parts of polyethylene having a melt index in the range of about 0.5 to about 15 g. per 10 minutes combined with about 95–5 parts of mixtures of particulate crystalline poly(ethylene terephthalate) of I.V. = 0.2 to 1.3 with crystalline poly(1,4-cyclohexylenedimethylene terephthalate) and/or with crystalline poly(tetramethylene terephthalate) of I.V. = 0.2 to 1.3, in all proportions.

The process and the scouring and purging composition of this invention make possible the manufacture of thermoplastic polymer coated photographic paper of exceptionally uniform quality at minimum expense for maintenance of the extruder and with a minimum loss of operating time for cleanout operations on the extruder compared to the previous cleanout practices.

In some cleaning operations it will be found advantageous to carry out the purging and scouring operation by using a series of mixtures in which the polyester component is the same, but the polyethylene component is varied from one having a low melt index to polyethylenes having progressively higher melt indexes. The polyethylene having the lowest melt index will have, as is known, the highest viscosity, and, accordingly, each polyethylene successively used will be less viscous. In this way, the viscosity of the fluid-phase forming polymer component can be adjusted to quickly purge the extruder of a particular organoplastic material, by using a polyethylene whose viscosity is smaller to that of the organoplastic material already in the extruder. Also, if the extruder is unable to readily crush and propel the composition because of inadequate power capacity when a high viscosity polyethylene is used, a polyethylene of a lower viscosity can be substituted to prepare a composition which can be propelled by the extruder screw to obtain the desired cleaning action.

The invention is further illustrated by the following examples:

EXAMPLE 1

A scouring and purging composition was prepared by blending about 30 lbs. of one-half inch × one-half inch × one-eighth inch crushable chips of highly crystalline brittle poly(ethylene terephthalate) of intrinsic viscosity of 0.62 with about 70 lbs. of low density polyethylene, D = 0.918, having a melt index of 8 grams per 10 minutes. The composition was fed into the feed hopper of an extruder which had been used previously for coating paper with a photographic paper coating grade of high density polyethylene having a melt index of 8 grams per 10 minutes, until the extruder was necessarily ready to be shut down for cleaning out of gels and other contaminants. The extruder was operated with its internal operating temperatures in the controlled heat zones set substantially as shown in Table 1. After all the scouring and purging composition had been extruded through the die of the extruder, the extruder was shut down, dismantled and inspected. It was observed on removal of the screw of the extruder that the accumulated polyethylene expected to be found on the screw lands and grooves and on the inner wall surfaces of the barrel of the extruder, based on previous experience, had been removed by the cleaning action of the purging composition to an extent at least equivalent to that obtainable by mechanical cleaning with scouring pads and scrapers by workmen.

EXAMPLE 2

A scouring and purging composition consisting solely of crushable chips (one-half inch × one-half inch × one-eighth inch) of highly crystalline brittle poly(ethylene terephthalate), intrinsic viscosity (I.V.) = 0.62, was fed into a contaminated extruder of the condition and heated in the manner described in Example 1. The extruder had been used to extrude high density polyethylene as in Example 1. The composition was found to be somewhat effective as a cleaning agent, but great difficulty was experienced in feeding the material into the extruder barrel and with slippage of the polyester in the flights 10 of the screw 3. This result shows the need for the presence of the fluid-phase forming polymer component, e.g. low density polyethylene, as a carrier for propelling the brittle scouring polymer through the extruder.

EXAMPLE 3

A scouring and purging composition consisting of 30% by weight of low density polyethylene of melt index 8 combined with 70% by weight of crushable one-half inch × one-half inch × one-eighth inch chips of highly crystalline brittle poly(ethylene terephthalate) of intrinsic viscosity = 0.62 was fed into a contaminated extruder of the condition and heated in the manner described in Example 1. The extruder had been used to extrude high density polyethylene as in Example 1. The results were similar to those obtained in Example 2, i.e. poor feeding and slippage being experienced. From the results obtained in Examples 2 and 3, it can be seen that the fluid-phase providing polymer component must be present in sufficient concentrations to act as a vehicle for the polyester chips, i.e., upon heating it must form a fluid-phase carrier for these chips.

EXAMPLES 4, 5, 6

Three scouring and purging compositions, a, b, and c, each consisting essentially of about 30% by weight of crushable chips of highly crystalline brittle poly(ethylene terephthalate) of I.V. = 0.38 mixed with about 70% by weight of a low density polyethylene of melt index 7 were prepared. The compositions differed from each other only in the sizes of the chips which were about one-eighth inch in thickness. In composition a, the chip size was all through five-sixteenths inch mesh screen (U.S. Sieve sizes). In composition b, the chip size was all through three-eighth inch mesh screen. In composition c, the chip size was all through one-half inch mesh screen. Each composition was used to clean out a contaminated extruder of the type and condition and heated in the way described in Example 1. In each case, the extruder had been used to extrude high density polyethylene. After each cleanout operation, the extruder was found upon inspection to be in a clean condition suitable for carrying out extrusions of high density polyethylene for coating paper intended for use as a photographic paper.

The invention has been described in detail with particular reference to preferred embodiments thereof, but it will be understood that variations and modifica-

I claim:

1. An extruder cleaning composition comprising a mixture of (1) discrete, crushable particles of a highly crystalline brittle thermoplastic first polymer having a high brittle point and (2) a thermoplastic second polymer which has a melting point below said brittle point and which upon heating above its said melting point forms a fluid-phase carrier for said particles, said highly crystalline polymer having a melting point up to about 350° C.

2. A composition according to claim 1 in which said first polymer is a linear polyester.

3. A composition according to claim 2 in which said second polymer is polyethylene; amorphous polyester having an intrinsic viscosity in phenol: chlorobenzene in about 60:40 weight ratio, of about 0.2 to 1.3 deciliters per gram determined at about 25° C. in a solution containing about 0.5 gram of polymer per 100 milliliters of phenol:chlorobenzene; polypropylene; copolymer of ethylene with a copolymerizable ethylenically unsaturated monomer; polyvinyl acetate; polyvinyl chloride; synthetic wax; polybutylene; or polyisobutylene.

4. A composition according to claim 2 in which said polyester is a highly crystalline, brittle, linear polyester resin having recurring cyclic structure in the polymer backbone, having a brittle temperature point above about 135° C., a melting point below about 315° C., and an intrinsic viscosity in phenol; chlorobenzene in about 60:40 weight ratio, of from about 0.2 to about 1.3 deciliters per gram determined at about 25° C. in a solution containing about 0.5 gram of polymer per 100 milliliters of phenol:chlorobenzene.

5. A composition according to claim 3 in which said second polymer is a polyethylene having a melt index in the range from about 0.5 to about 15 g. per 10 minutes with ASTM test method D1238E and a melting point of about 80° to about 100° C.

6. A composition according to claim 4 wherein said polyester resin is poly(ethylene terephthalate), poly(1,4-cyclohexylenedimethylene terephthalate), poly(ethylene isophthalate), poly(tetramethylene terephthalate), poly(ethylene napthalenedicarboxylate) or mixtures thereof.

7. A composition according to claim 6 wherein said polyester resin is poly(ethylene terephthalate) having an intrinsic viscosity in phenol:chlorobenzene in about 60:40 weight ratio of from about 0.38 to about 0.62 deciliters per gram determined at about 25° C. in a solution containing about 0.5 gram of polymer per 100 milliliters of phenol:chlorobenzene.

8. A composition according to claim 1 in which there are present, by weight, from about 5 to about 95 parts of said first polymer and from about 95 to about 5 parts of said second polymer.

* * * * *